United States Patent
Krapf et al.

(10) Patent No.: US 8,190,286 B2
(45) Date of Patent: May 29, 2012

(54) MACHINE TOOL MONITORING DEVICE

(75) Inventors: Reiner Krapf, Reutlingen (DE); Michael Mahler, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 610 days.

(21) Appl. No.: 11/995,950

(22) PCT Filed: Nov. 9, 2006

(86) PCT No.: PCT/EP2006/068270
§ 371 (c)(1),
(2), (4) Date: Jan. 17, 2008

(87) PCT Pub. No.: WO2007/054529
PCT Pub. Date: May 18, 2007

(65) Prior Publication Data
US 2010/0114358 A1    May 6, 2010

(30) Foreign Application Priority Data
Nov. 14, 2005  (DE) .......................... 10 2005 054 128

(51) Int. Cl.
*G06F 19/00* (2006.01)
*G05B 13/02* (2006.01)
*G06N 7/02* (2006.01)
*G08B 13/18* (2006.01)
*G01S 13/00* (2006.01)

(52) U.S. Cl. ............ 700/177; 700/50; 706/52; 340/552; 340/567; 342/21

(58) Field of Classification Search ............ 700/28, 700/50, 173, 174, 177, 178; 701/207, 223; 702/182; 706/1, 16–18, 46, 52; 340/552, 340/565–567, 572.1, 572.2, 572.4, 870.01, 340/901–903, 1.1, 12.1, 12.15, 12.22, 12.5, 340/12.54; 342/21, 27, 28
See application file for complete search history.

(56) References Cited

U.S. PATENT DOCUMENTS
4,634,968 A * 1/1987 Aslan ............................. 324/95
5,361,070 A * 11/1994 McEwan ........................ 342/21
(Continued)

FOREIGN PATENT DOCUMENTS
DE    40 20 551    1/1992
(Continued)

OTHER PUBLICATIONS
Cheng, Y., et al: "Initial Study of the Detection of Partial Discharge With . . . " Journal of Xi'An Jiaotong University, vol. 31, No. 11, Nov. 1977, pp. 1-7.
(Continued)

*Primary Examiner* — Crystal J Barnes-Bullock
(74) *Attorney, Agent, or Firm* — Michael J. Striker (57) ABSTRACT

A machine tool monitoring device of a machine tool for machining a work piece, includes a signal unit (24) provided for an ultra-broad-band operation. The signal unit (24) processes a signal (32, 34), which has a sequence (46) of pulses (48) and includes an arithmetic-logic unit (40) for associating a detected signal (34) with a use situation (52, 58) by means of a fuzzy logic-based and/or neural logic-based signal processing. The signal unit (24) preferably has a programmable data base (44) in which a use situation (52, 58) in a machining process is associated with a procedure (56, 60) for changing the machining process.

10 Claims, 5 Drawing Sheets

U.S. PATENT DOCUMENTS

| | | | |
|---|---|---|---|
| 5,446,461 A * | 8/1995 | Frazier | 342/22 |
| 5,870,351 A * | 2/1999 | Ladabaum et al. | 367/163 |
| 6,717,517 B2 * | 4/2004 | Przygoda, Jr. | 340/572.4 |
| 6,778,097 B1 * | 8/2004 | Kajita et al. | 340/12.5 |
| 6,959,631 B2 * | 11/2005 | Sako | 83/58 |
| 7,102,537 B2 * | 9/2006 | Inoue et al. | 340/903 |
| 7,132,975 B2 * | 11/2006 | Fullerton et al. | 342/28 |
| 7,173,537 B2 | 2/2007 | Voigtlaender | |
| 7,221,169 B2 * | 5/2007 | Jean et al. | 324/639 |
| 7,339,526 B2 * | 3/2008 | Zimmerman | 342/464 |
| 7,380,213 B2 * | 5/2008 | Pokorny et al. | 715/764 |
| 7,446,861 B2 * | 11/2008 | Ouchi | 356/5.01 |
| 7,725,252 B2 * | 5/2010 | Heddebaut et al. | 701/207 |
| 7,750,841 B2 * | 7/2010 | Oswald et al. | 342/147 |
| 7,809,077 B2 * | 10/2010 | Ikramov et al. | 375/295 |
| 2007/0282781 A1 * | 12/2007 | Mathiesen et al. | 707/1 |
| 2010/0018830 A1 * | 1/2010 | Krapf et al. | 192/129 A |

FOREIGN PATENT DOCUMENTS

| | | |
|---|---|---|
| DE | 198 13 041 | 10/1999 |
| DE | 102 61 791 | 7/2004 |
| EP | 1 422 022 | 5/2004 |
| EP | 1422022 A1 * | 5/2004 |
| JP | 2003-121537 | 4/2003 |
| JP | 2003-185735 | 7/2003 |
| JP | 2004-160822 | 6/2004 |
| JP | 2004-283991 | 10/2004 |
| WO | 2007/054529 | 5/2007 |

OTHER PUBLICATIONS

"Microstrip Antenna Design Handbook": Remesh Garg, Prakash Bhartia, Inderbahl, Issued by Artech House, Inc. 2001, p. 235.

* cited by examiner

MACHINE TOOL MONITORING DEVICE

CROSS-REFERENCE

The invention described and claimed hereinbelow is also described in PCT/EP2006/068270, filed on Nov. 9, 2006 and DE 102005054128.3, filed on Nov. 14, 2005. This German Patent Application, whose subject matter is incorporated here by reference, provides the basis for a claim of priority of invention under 35 U.S.C. 119(a)-(d).

BACKGROUND OF THE INVENTION

The invention is based on a power tool monitoring device.

DE 102 61 791 A1 has disclosed a power tool monitoring device for a circular saw. The device has a sensor unit, which is for generating and detecting an electromagnetic signal and is situated in the vicinity of a saw blade. The approach of a body part to the saw blade can be detected by monitoring the signal spectrum. A public band is used as the frequency band for the signal.

SUMMARY OF THE INVENTION

The invention is based on a power tool monitoring device.

According to one proposal of the present invention, the power tool monitoring device has a signal unit provided for an ultra-broad-band operation. Through the use of ultra-broad-band signals, it is possible to achieve a high information density and thus an effective monitoring. In particular, a plurality of working parameters can be simultaneously monitored during the use of a power tool, thus permitting the achievement of safe, convenient working conditions. The expression "a signal unit provided for an ultra-broad-band operation" is understood in particular to mean a unit with which an ultra-broad-band signal can be generated, received, and/or evaluated. An "ultra-broad-band signal" is understood in particular to be a signal that has a frequency spectrum with a center frequency and a frequency bandwidth of at least 500 MHz. The center frequency is preferably selected to be in the frequency range from 1 GHz to 15 GHz.

According to another proposal of the present invention, the signal unit is provided for processing a signal that contains a sequence of pulses. It is thus possible to produce large frequency bandwidths. In the processing of the signal, the signal can in particular be generated, received, and/or evaluated. A "sequence" of pulses is in particular understood to be a series of pulses in chronological sequence with one another. In a representation of the signal amplitude in relation to time, a pulse can be of a certain pattern such as a rectangular wave, a Gaussian profile, etc. A pulse duration or a value that characterizes the transmission time of the pattern is preferably selected to be in the range from 0.1 ns (nanoseconds) to 2 ns. Within the sequence, the pulses can follow one another in a chronologically regular fashion in that the time interval between each pair of pulses in direct sequence is constant. Alternatively, the pulses can follow one another in a chronologically irregular fashion. In this case, the time interval between two pulses in direct sequence can be embodied as a random variable. For example, the sequence can be embodied in the form of a PN sequence (pseudo-noise sequence). Alternatively or in addition, the signal unit can be provided for processing a signal that is modulated in its frequency, e.g. an FMCW signal (frequency modulated continuous wave signal).

The signal unit advantageously includes an arithmetic-logic unit that is provided for associating a detected signal with a particular use situation by means of a fuzzy logic-based and/or neural logic-based signal processing. Using fuzzy logic, the arithmetic-logic unit can quickly evaluate a large and complex quantity of information based on the detected signal. This allows the power tool monitoring device to react within a very short timeframe to situations that appear to be critical to a user's safety. By contrast with capacitance sensors, it is thus possible to react to a critical use situation before a physical contact occurs between the user and the power tool. By means of a neural logic, it is possible to achieve advantageous self-learning functions of the power tool monitoring device.

According to a proposal in an advantageous modification of the present invention, the signal unit has a data base in which a use situation is associated with at least one signal pattern. A particularly rapid identification process of a use situation can be advantageously achieved by searching for a correlation between a detected signal and a signal pattern. In this instance, it is advantageously possible to use a fuzzy logic-based correlation method.

According to a proposal in another embodiment of the invention, the signal unit has a programmable data base in which a use situation in a machining process is associated with a procedure for changing the machining process. If a certain use situation has been identified, it is therefore possible to react to this use situation within a very short timeframe. The data base is programmable, in particular by a user of the power tool, preferably when the power tool is in the assembled state. It is thus possible to advantageously expand the factory settings of the data base, e.g. when a user equips the power tool with additional tools or accessories.

Preferably, the signal unit is provided for determining a work progress in a machining of a work piece. It is thus possible to achieve a high level of operating convenience when using a power tool. It is advantageously possible to define various work phases in the machining of a work piece; a safety level of the monitoring of the work piece machining is adapted to these work phases.

If the signal unit is provided for determining a distance, then it is advantageously possible to monitor a position of a tool or the work piece during a machining of a work piece. It is thus possible, for example, to quickly identify abnormal positions, e.g. when there is an imbalance of the tool or an incorrect positioning of a work piece. It is also possible to determine a dimension of a work piece. It is advantageously possible to monitor a work progress.

Preferably, the signal unit is provided for determining a speed of a work piece to be machined. It is thus advantageously possible to monitor a work progress. The signal unit is preferably provided for determining a translation and/or rotation speed of the work piece in relation to a stationary element of a power tool, e.g. a housing.

In another embodiment variant of the present invention, the power tool monitoring device has an electronic output device that is provided for informing a user of a particular piece of monitoring information, thus making it possible to further increase the safety and operating convenience during use. The output device can be embodied in the form of a display, e.g. an LED or LCD display. Alternatively or in addition, it is possible for the output device to be provided for emitting an acoustic signal, for example.

If the power tool monitoring device has an electronic input device, which is provided for inputting at least one piece of monitoring information, then this allows a user to conveniently carry out a configuration of monitoring functions.

If the power tool monitoring device has a regulating device, which is provided for regulating at least one parameter of the work piece machining process, then it is advantageously possible to increase work quality.

BRIEF DESCRIPTION OF THE DRAWINGS

Other advantages ensue from the following description of the drawings. The drawings show an exemplary embodiment of the invention. The drawings, the description, and the claims contain numerous defining characteristics in combination. Those skilled in the art will also suitably consider the defining characteristics individually and unite them into other meaningful combinations.

DETAILED DESCRIPTION OF THE EXEMPLARY EMBODIMENT

Figure 1:
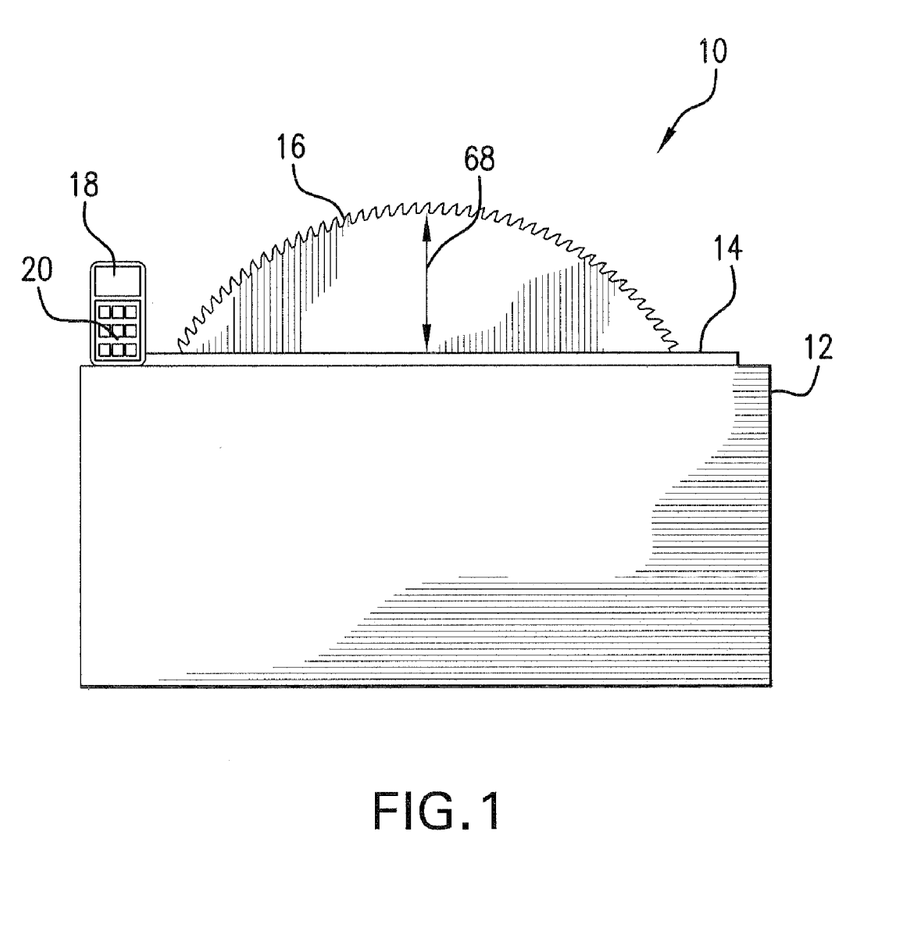
FIG. 1 is a side view of a circular saw with a saw blade and an input/output device.

FIG. 1 shows a power tool embodied in the form of a circular saw 10. This has a housing 12, a work surface 14 for placement of a work piece to be sawn, a saw blade 16, an output device 18 with an LCD display, and an input device 20.

Figure 2:
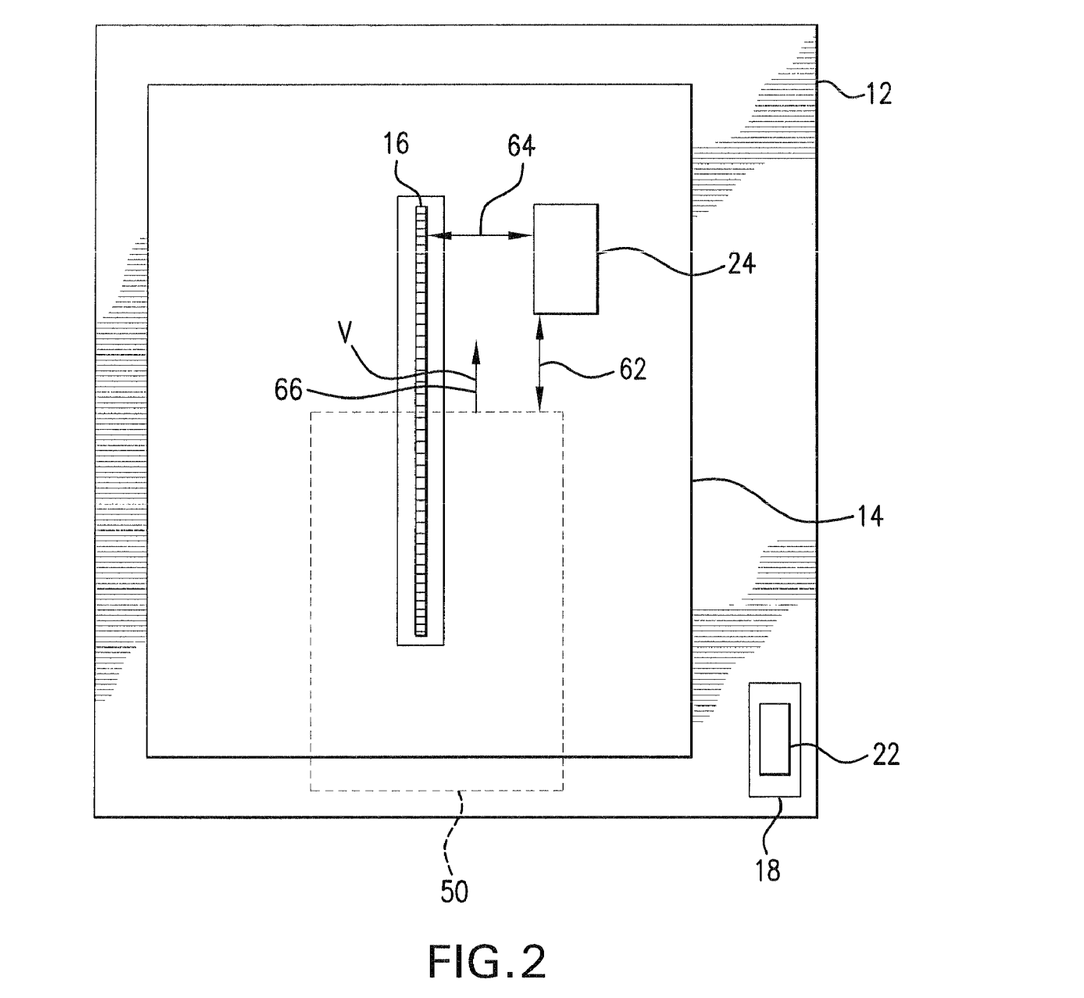
FIG. 2 is a top view of the circular saw with a signal unit.

FIG. 2 is a top view of the circular saw 10. It shows the housing 12, the work surface 14, the output device 18, and the saw blade 16. The output device 18 is provided with a speaker 22. The input device 20 and the output device 18 are parts of a power tool monitoring device that also has an ultra-broadband signal unit 24.

The signal unit 24 can be used to implement a variety of monitoring functions during a machining of a work piece. The design and function of the signal unit 24 are explained in conjunction with FIG. 3.

Figure 3:
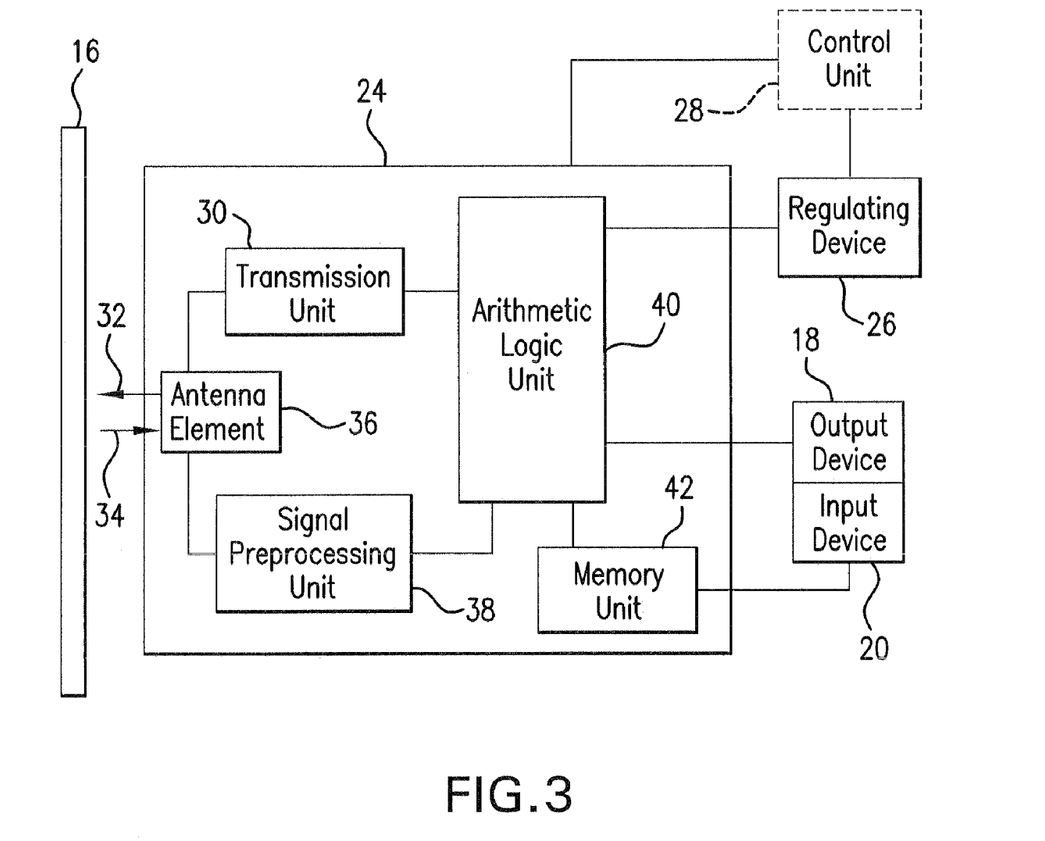
FIG. 3 is a schematic depiction of the signal unit.

FIG. 3 shows the power tool monitoring device with the signal unit 24, the input device 20, the output device 18, and a regulating device 26. In addition, a control unit 28 of the circular saw 10 is depicted with dashed lines. The signal unit 24 has a transmitter unit 30 that is provided for generating an ultra-broad-band transmission signal 32. The signal unit 24 is provided with an ultra-broad-band antenna element 36 for transmitting the transmission signal 32 and receiving a reception signal 34. As an alternative to the antenna element 36, the signal unit 24 can have a capacitor unit. To this end, a capacitor arrangement can be simply embodied—for example between a metallic surface and the saw blade 16. After the reception signal 34 is received, it is filtered, amplified, and converted into a digital form in a signal preprocessing unit 38 and is then furnished to an arithmetic-logic unit 40 for processing. The signal unit 24 also has a memory device 42 in which a data base 44 containing monitoring information is stored. With the aid of the input device 20, a user of the circular saw 10 can program this data base 44, whose function will be described below.

Figure 4:
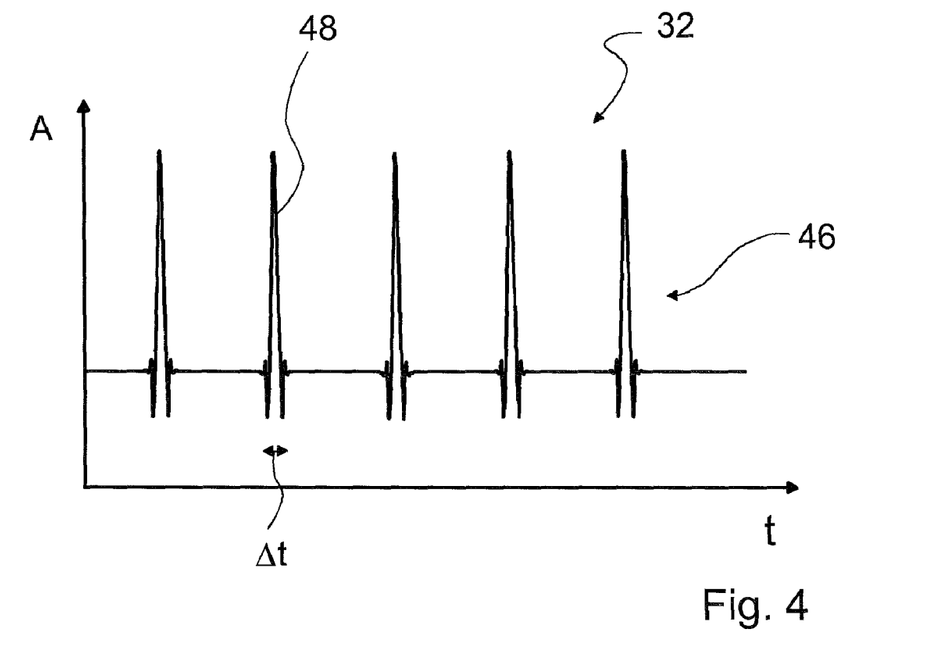
FIG. 4 is an amplitude/time representation of a broadband signal generated by the signal unit.
Figure 5:
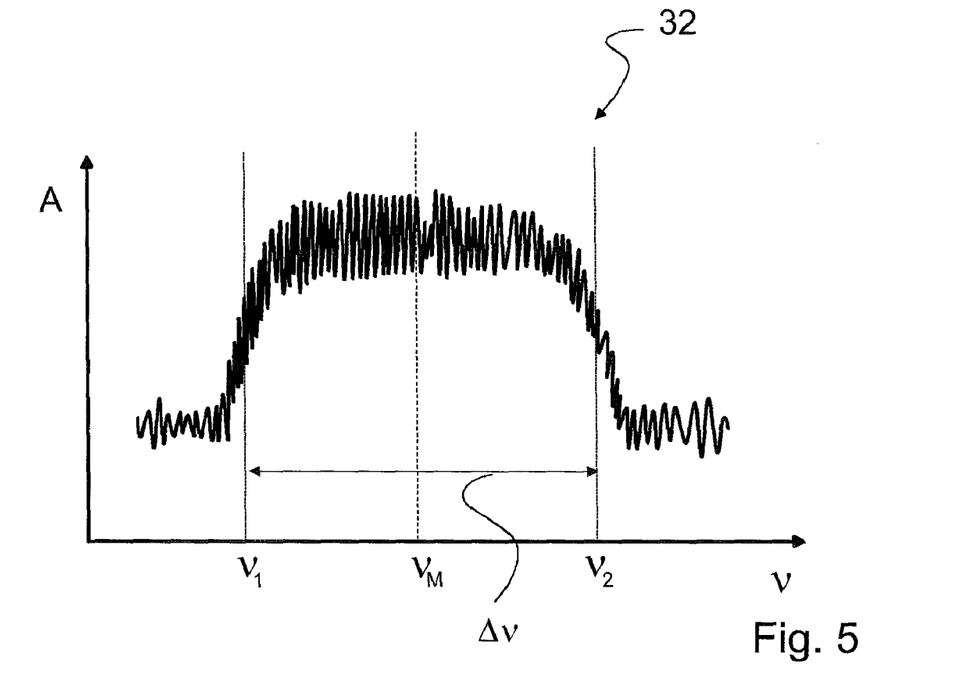
FIG. 5 is an amplitude/frequency representation of the signal.

The generation of an ultra-broad-band signal will be explained in conjunction with FIGS. 4 and 5. In FIG. 4, an amplitude A of the transmission signal 32 is plotted on the y-axis and time t is plotted on the x-axis. The transmission signal 32 has a sequence 46 of pulses 48; the pulses 48 are each transmitted with a respective pulse duration $\Delta t$ of 0.5 ns and follow one another at regular intervals. The pulse duration $\Delta t$ is associated with a signal band width $\Delta v$ of the transmission signal 32, which is shown in FIG. 5. This figure depicts the spectrum of the transmission signal 32; the amplitude A is plotted on the y-axis and a frequency v is plotted on the x-axis. The transmission signal 32 is transmitted with a center frequency $v_M$ of 5 GHz and a signal bandwidth $\Delta v$ of 2 GHz around this center frequency $v_M$. An underfrequency $v_1$=4 GHz and an overfrequency $v_2$=6 GHz. As an alternative to the generation of pulses 48, there are other conceivable methods that would be deemed reasonable those skilled in the art for generating ultra-broad-band signals. The transmission signal 32 is also transmitted with a transmission power below −45 dBm so that it is possible to avoid undesirable interference with other radio devices.

Figure 6:
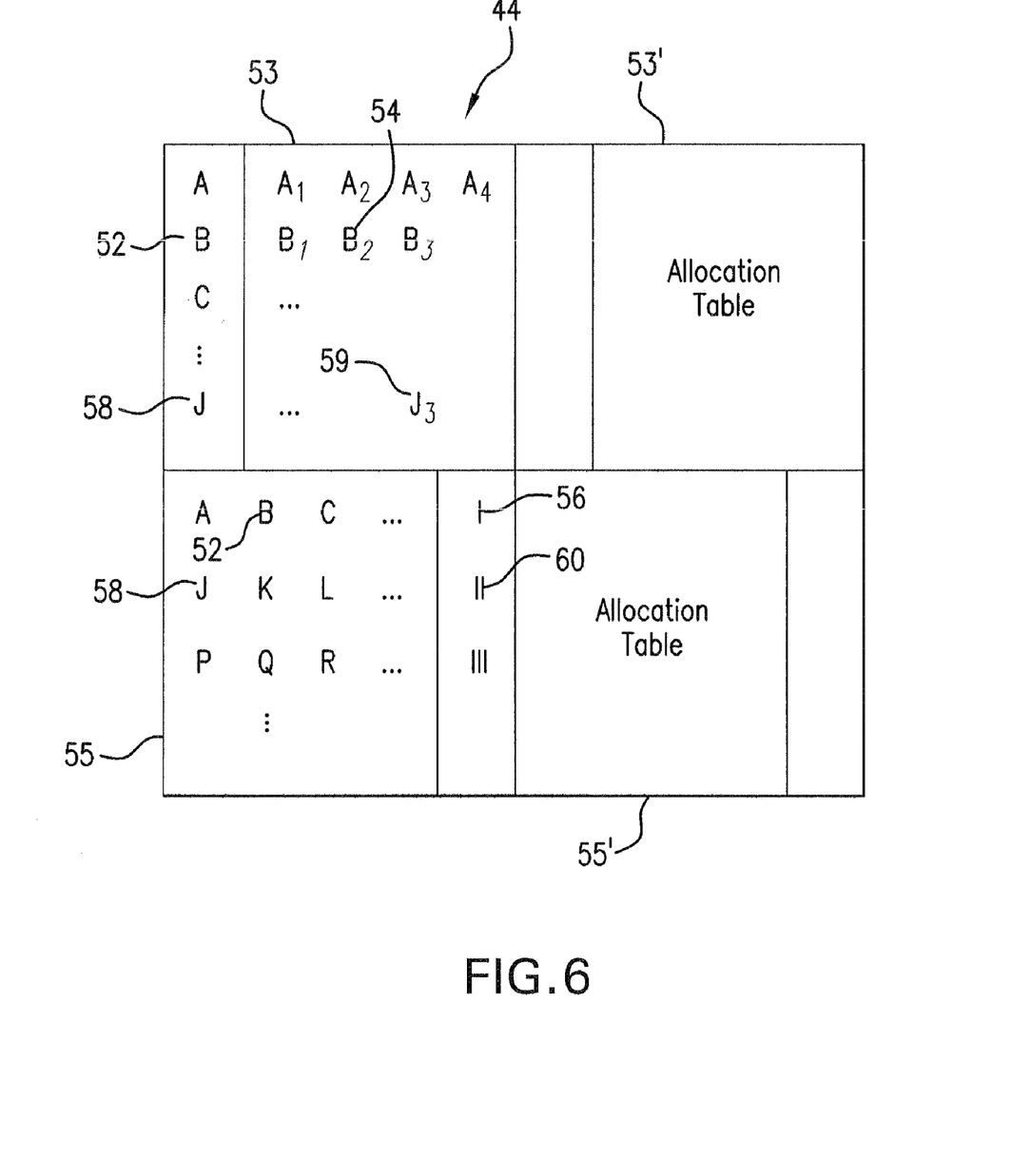
FIG. 6 shows a data base of the signal unit.

It is assumed that a user wishes to saw a work piece 50, which is shown with dashed lines in FIG. 2. To this end, the work piece 50 is placed onto the work surface 14. This use situation is identified as use situation 52. The placement of the work piece 50 induces a change in the dielectric encompassing the signal unit 24, which is reflected in a change in the reception signal 34. For example, after the placement, a resonance frequency is shifted in the frequency spectrum of the reception signal 34. The arithmetic-logic unit 40 can associate this detected reception signal 34 with the use situation 52. This occurs by means of the data base 44, which is shown in FIG. 6. In the data base 44, signal patterns, e.g. $A_3$, $B_2$, etc., are each associated with a respective use situation A or B in an allocation table 53. In the present example, let us assume that the use situation 52 to be identified by the arithmetic-logic unit corresponds to the entry B in the data base. Based on the detected reception signal 34, the arithmetic-logic unit 40 tests for a correlation between the reception signal 34 and the signal patterns until it determines a signal pattern 54, which has the greatest correlation with the detected reception signal 34. In the present example, it is assumed that this signal pattern 54 corresponds to the entry $B_2$ in the data base 44. The determination of the signal pattern 54 is executed by means of a fuzzy logic method. In an additional allocation table 55 of the data base, use situations A, B, C, etc. are associated with procedures I, II, III, etc. for the machining of the work piece. When the arithmetic-logic unit 40 identifies a use situation, it is possible to react to this use situation by the control unit 24 that is connected to the arithmetic-logic unit 40 modifying the procedure in accordance with a progress of the machining of the work piece. In the present example, the use situation 52 is associated with a procedure 56 that corresponds to the entry I in the data base. In this procedure 56, the operation of the circular saw 10 continues unchanged.

Let us then assume that a finger of the user is approaching the saw blade 16. This is reflected in the spectrum of the reception signal 34 by multiple resonance frequencies that characterize human tissue. This use situation is identified as use situation 58, which the arithmetic-logic unit 40 identifies from the dictated reception signal 34 by determining a correlated signal pattern 59. In the data base 44, the use situation 58 is associated with a procedure 60 in which the operation of the circular saw 10 is switched off. Furthermore, additional signal patterns can be taken into account for the identification of use situations. For example, a certain shifting speed of a resonance frequency in the spectrum of the reception signal 34 can be taken into account as a signal pattern; a "slow" shift and a "fast" shift can each be associated with a respective use situation.

The input device 20 allows a user to carry out a configuration of the data base 44. In particular, the user can adapt the data base 44 to new uses of the circular saw 10, e.g. the use of additional sawing means or a newly developed accessory, and/or the user can set a new procedure that is associated with certain use situations. Entries in the allocation tables 53 and 55 can be modified, and/or new allocation tables 53' and 55' can be created. In order to expand the data base 44 with new use situations and new procedures for these use situations, the circular saw 10 is provided with a learning mode. In this mode, the user can intentionally create use situations; the arithmetic-logic unit 40 can automatically learn to identify these use situations and learn to determine which procedures are adapted to these use situations. In this instance, the arithmetic-logic unit 40 learns to correlate each of these use situations with one or more signal patterns. To this end, the arithmetic-logic unit 40 functions in this mode on the basis of neural logic, which permits such a self-learning function. At any time, the user can set a safety level until a desired procedure for a certain use situation is reached. This can be automatically stored in the data base 44.

The arithmetic-logic unit 40 can also be used to determine a distance. To this end, the arithmetic-logic unit 40 can detect a travel time between the generation of the transmission signal 32 and the receipt of the reception signal 34, e.g. by carrying out a phase comparison between the transmission signal 32 and the reception signal 34. During the machining of the work piece, a distance 62 from the work piece 50 and a distance 64 from the saw blade 16 are determined. By determining the distance 62, it is possible to monitor a work progress in the machining of the work piece 50. By monitoring the distance 64, bodily injuries due to an imbalance of the saw blade 16 can be avoided through an identification of abnormal vibrations of the saw blade 16 and through a reduction in the speed of the saw blade 16 by the control unit 28. Through an evaluation of frequency and/or phase shifts between the transmission signal 32 and the reception signal 34, it is possible to monitor a speed V with which the work piece 50 is being slid in the working direction 66. This information can likewise be used to monitor the work piece machining progress. In addition, it is possible to define various work phases in the machining of a work piece, with particular monitoring functions being adapted to these work phases. During the starting phase after the work piece 50 has been set into place, it is possible in particular to monitor the position of the work piece 50 in relation to the saw blade 16. At the end of the work piece machining, it is possible in particular to focus the monitoring criteria on the position of a finger in relation to the saw blade 16.

In addition, the input device 20 can be used to set working parameters for a work piece machining, e.g. a speed of the saw blade, a sawing depth 68 (FIG. 1), a saw blade type, etc. The regulating device 26 can keep working parameters such as the sawing depth 68, which are monitored by the power tool monitoring device, at a value set by the user. The output device 18 can serve to inform the user about the working parameters being monitored. These can be displayed on the LED display. When a working parameter reaches a predetermined threshold and/or in certain use situations such as an incorrect placement of a work piece, the user can be informed by means of an acoustic signal that is transmitted via the speaker 22. Through an evaluation of the ultra-broad-band reception signal 34, it is conceivably possible to carry out a measurement and/or monitoring of additional working parameters such as a dimension, a moisture level of a work piece, etc.

The power tool monitoring device can advantageously be used in other stationary power tools such as band saws, cross-cut saws, planers, etc. In addition, it is also conceivable for the power tool monitoring device to be used in hand-guided power tools such as circular saws, jigsaws, chainsaws, etc. In this case, the power tool monitoring device can, by means of the signal unit, offer an advantageous protection in critical use situations such as a kick back of a hand-held circular saw.

Reference Numerals

10 circular saw
12 housing
14 work surface
16 saw blade
18 output device
20 input device
22 speaker
24 signal unit
26 regulating device
28 control unit
30 transmission unit
32 transmission signal
34 reception signal
36 antenna element
38 signal preprocessing unit
40 arithmetic-logic unit
42 memory unit
44 data base
46 sequence
48 pulse
50 work piece
52 use situation
53 allocation table
53' allocation table
54 signal pattern
55 allocation table
55' allocation table
56 procedure
58 use situation
59 signal pattern
60 procedure
62 distance
64 distance
66 working direction
68 sawing depth
t time
$\nu$ frequency
$\Delta t$ pulse duration
$\Delta \nu$ signal band width
$\nu_M$ center frequency
$\nu_1$ underfrequency
$\nu_2$ overfrequency
A amplitude
V speed

What is claimed is:

1. A machine tool monitoring device of a machine tool for machining a work piece, comprising:
    a signal unit (24) provided for an ultra-broad-band operation,
    wherein the signal unit (24) has a programmable data base (44) in which a use situation (52, 58) in a machining process is associated with a procedure (56, 60) for changing the machining process,
    wherein the signal unit (24) includes an arithmetic-logic unit (40) that is provided for associating a detected signal (34) with a use situation (52, 58) by means of a fuzzy logic-based and/or neural logic-based signal processing.

2. The machine tool monitoring device as recited in claim 1, wherein the signal unit (24) is provided for processing a signal (32, 34), which has a sequence (46) of pulses (48).

3. The machine tool monitoring device as recited in claim 1, wherein the signal unit (24) is provided for determining a work progress in a machining of a work piece.

4. The machine tool monitoring device as recited in claim 3, wherein the signal unit (24) is provided for determining a distance (62, 64).

5. The machine tool monitoring device as recited in claim 1,
wherein the signal unit (24) is provided for determining a speed (V) of a work piece (50) to be machined.

6. The machine tool monitoring device as recited in claim 5, wherein the signal unit (24) has a data base (44) in which a use situation (52, 58) is associated with at least one signal pattern (54, 59).

7. The machine tool monitoring device as recited in claim 5, further comprising an electronic output device (18) that is provided for outputting a piece of monitoring information to a user.

8. The machine tool monitoring device as recited in claim 5, further comprising an electronic input device (20) that is provided for inputting at least one piece of monitoring information.

9. The machine tool monitoring device as recited in claim 1,
further comprising a regulating device (26) that is provided for regulating at least one parameter (68) of a work piece machining process.

10. A machine tool, comprising:
a machine tool monitoring device, said machine tool monitoring device comprising a signal unit (24) provided for an ultra-broad-band operation,
wherein the signal unit (24) has a programmable data base (44) in which a use situation (52, 58) in a machining process is associated with a procedure (56, 60) for changing the machining process, and wherein the signal unit (24) includes an arithmetic-logic unit (40) that is provided for associating a detected signal (34) with a use situation (52, 58) by means of a fuzzy logic-based and/or neural logic-based signal processing.

* * * * *